(12) United States Patent
Giusti et al.

(10) Patent No.: US 11,772,871 B2
(45) Date of Patent: Oct. 3, 2023

(54) PACKAGING FOR A FOOD PRODUCT

(71) Applicant: CHEF PACK, LLC, Lake In The Hills, IL (US)

(72) Inventors: Arturo Giusti, Bomarzo (IT); Barton Lewis, Jr., Algonquin, IL (US)

(73) Assignee: CHEF PACK, LLC, Lake In The Hills, IL (US)

( * ) Notice: Subject to any disclaimer, the term of this patent is extended or adjusted under 35 U.S.C. 154(b) by 718 days.

(21) Appl. No.: 16/618,285

(22) PCT Filed: May 31, 2018

(86) PCT No.: PCT/IB2018/053873
§ 371 (c)(1),
(2) Date: Nov. 29, 2019

(87) PCT Pub. No.: WO2018/220568
PCT Pub. Date: Dec. 6, 2018

(65) Prior Publication Data
US 2020/0317422 A1 Oct. 8, 2020

Related U.S. Application Data

(63) Continuation of application No. 15/611,105, filed on Jun. 1, 2017, now Pat. No. 10,640,277.

(51) Int. Cl.
*C09J 167/04* (2006.01)
*B65D 81/34* (2006.01)
(Continued)

(52) U.S. Cl.
CPC ........... *B65D 81/3453* (2013.01); *B65D 1/36* (2013.01); *B65D 25/14* (2013.01); *B65D 65/40* (2013.01);
(Continued)

(58) Field of Classification Search
None
See application file for complete search history.

(56) References Cited

U.S. PATENT DOCUMENTS 3,983,256 A 9/1976 Norris et al.
4,270,665 A * 6/1981 Kunimoto .............. B65D 41/12
215/347

(Continued)

FOREIGN PATENT DOCUMENTS

CN 101873977 A 10/2010
DE 69917480 T2 5/2005

(Continued)

OTHER PUBLICATIONS

Gupta et al., Crosslinking Reaction of Epoxy Resin (Diglycidyl Ether of Bisphenol A) by Anionically Polymerized Polycaprolactam: I. Mechanism and Optimization, Journal of Applied Polymer Science, vol. 89, 3237-3247 (2003). (Year: 2003).*

(Continued)

*Primary Examiner* — Ling Siu Choi
*Assistant Examiner* — Huihong Qiao
(74) *Attorney, Agent, or Firm* — Steinfl + Bruno LLP

(57) ABSTRACT

A packaging or wrapping for a food product, capable of resisting to high temperatures and of eliminating the overpressure generated by the water vapour inside the packaging due to temperature rise, without the same packaging having any aperture communicating its inside and the outside environment. The packaging is also adapted to restrain/reduce the emission of odor-generating substances that are generated during the heating or baking of the packaged food product, with respect to what occurs in the absence of a packaging, or with a packaging provided with apertures.

11 Claims, 4 Drawing Sheets

(51) Int. Cl.

| | |
|---|---|
| *B65D 1/36* | (2006.01) |
| *B65D 25/14* | (2006.01) |
| *B65D 81/38* | (2006.01) |
| *B65D 65/42* | (2006.01) |
| *C09J 131/04* | (2006.01) |
| *B65D 65/40* | (2006.01) |
| *B65D 77/20* | (2006.01) |
| *C09J 1/02* | (2006.01) |
| *C09J 201/00* | (2006.01) |

(52) U.S. Cl.
CPC ......... *B65D 65/42* (2013.01); *B65D 77/2032* (2013.01); *B65D 81/343* (2013.01); *B65D 81/3823* (2013.01); *B65D 81/3874* (2013.01); *B65D 81/3897* (2013.01); *C09J 1/02* (2013.01); *C09J 131/04* (2013.01); *C09J 167/04* (2013.01); *C09J 201/00* (2013.01)

(56) References Cited

U.S. PATENT DOCUMENTS

| | | | |
|---|---|---|---|
| 4,387,551 | A | 6/1983 | Cowan |
| 6,307,192 | B1 | 10/2001 | Ulfstedt et al. |
| 10,640,277 | B2 | 5/2020 | Giusti et al. |
| 2004/0180118 | A1 | 9/2004 | Renger et al. |
| 2006/0127539 | A1 | 6/2006 | Van Cuijk |
| 2007/0087131 | A1* | 4/2007 | Hutchinson ............ H05H 1/00 427/533 |
| 2012/0077029 | A1 | 3/2012 | Troutman et al. |
| 2012/0207887 | A1 | 8/2012 | Battersby et al. |
| 2014/0084011 | A1 | 3/2014 | Sanders |
| 2014/0144161 | A1 | 5/2014 | Pointer et al. |
| 2014/0180118 | A1 | 6/2014 | Stigall |
| 2014/0196410 | A1 | 7/2014 | Amigoni et al. |
| 2016/0355778 | A1 | 12/2016 | Tetart et al. |
| 2017/0182740 | A1 | 6/2017 | Reuterhage et al. |
| 2017/0258632 | A1 | 9/2017 | Inoue et al. |
| 2018/0346228 | A1 | 12/2018 | Giusti et al. |
| 2019/0009960 | A1 | 1/2019 | Sakurai et al. |
| 2019/0062514 | A1 | 2/2019 | Sasaki et al. |

FOREIGN PATENT DOCUMENTS

| | | |
|---|---|---|
| EP | 0295834 A1 | 12/1988 |
| EP | 0462767 A2 | 12/1991 |
| EP | 1439129 A1 | 7/2004 |
| EP | 1448381 B1 | 8/2006 |
| EP | 1739030 A2 | 1/2007 |
| WO | 97/10293 A1 | 3/1997 |
| WO | 2010/018304 A1 | 2/2010 |
| WO | 2017/033824 A1 | 3/2017 |

OTHER PUBLICATIONS

First Chinese Office Action for CN Application No. 201880036714.4 filed on May 31, 2018, on behalf of Chef Pack, LLC., dated May 28, 2021. 11 Pages CN Original + English Tranlsation.

Notice of Reason of Refusal issued for Japanese Application No. 2019-566752 filed on May 31, 2018, on behalf of Chef Pack, LLC, dated Apr. 5, 2022. 18 Pages. JP Original + English Translation.

"The Megalithic Yard", Aug. 11, 2005, Wayback Machine, http://www.ancient-wisdom.com/megalithicyard.htm, p. 1 (Year: 2015).

International Search Report and Written Opinion for International Application No. PCT/IB2018/053873 filed on May 31, 2018 on behalf of Chef Pack, LLC, dated Oct. 31, 2018. 20 pages.

Non-Final Office Action for U.S. Appl. No. 15/611,105 filed on Jun. 1, 2017 on behalf of Chef Pack LLC, dated Sep. 19, 2019. 18 pages.

Non-Final Office Action for U.S. Appl. No. 15/611,105, filed on Jun. 1, 2017, on behalf of Chef Pack LLC, dated May 6, 2019. 11 pages.

Restriction Requirement for U.S. Appl. No. 15/611,105, filed on Jun. 1, 2017, on behalf of Chef Pack LLC, dated Dec. 17, 2018. 11 pages.

Notice of Allowance for U.S. Appl. No. 15/611,105, filed on Jun. 1, 2017, on behalf of Chef Pack LLC, dated Jan. 9, 2020. 10 pages.

\* cited by examiner

PACKAGING FOR A FOOD PRODUCT

CROSS REFERENCE TO RELATED APPLICATIONS

The present application is the U.S. national stage of International Patent Application PCT/IB2018/053873 filed internationally on May 31, 2018, which, in turn, is a continuation of U.S. Non-Provisional application Ser. No. 15/611,105 filed on Jun. 1, 2017.

FIELD OF THE INVENTION

The present disclosure relates to a packaging made prevalently or exclusively of a fibrous cellulosic material, in particular cellulose fiber, suitable for containing a food product and suitable to be put into an oven, or other apparatus, for the heating or baking of the product.

The present disclosure relates in particular to the field of packaging ready meals.

BACKGROUND

In the field of ready-meals there are several known packages suitable to be put into an apparatus, in particular an oven, apt to elevate the temperature of the packaging and of the food product contained therein.

Such known packages differ one another mainly for their suitability to a thermal treatment in a specific type of apparatus (microwave oven, conventional oven, over for accelerated baking or other).

The prior art packages intended for the above described use are generally made at least partially of a plastic material, or they are completely laminated, in the portion contacting the food product, with materials such as cellophane or regenerated cellulose. These latter materials are provided with properties of thermal resistance and impermeability via a coating of thermoplastic polymers such as e.g. PVDC (polyvinylidene chloride), acrylic polymers and the like, that, in fact, attain impermeability to fat, liquids and vapors. In this way, the packaging remains suitably stiff from a structural standpoint, at the same time preserving the organoleptic properties of the food product during transportation, distribution and shelf life.

The use of the above described plastic and cellulosic materials results in an intrinsic barrier to water vapor; because of this, breathability, and in particular the necessary evacuation of water vapor during the heating process, is obtained via micro- or macro-apertures formed in the packages. In a few known packages such apertures are active, for gas exchange, only during the baking process.

However, the provision of apertures endangers product integrity, exposing it to a risk of contamination by external agents.

Moreover, the packaged product may come out from such apertures, in particular when it is, wholly or partially, in a liquid state, with the consequent possible soiling of the appliance used for heating/baking.

Also, these apertures let all the odors deriving from the food heating/baking process be released in the surrounding environment.

It is also to be noticed that the direct ejection of water vapor trough the apertures, caused by the temperature increase, inevitably carries other substances, like vaporized fats. These latter substances, by depositing on the walls of the heating appliance, cause dirtiness and produce, as a result of the carbonization of the fat substances, (further) undesired odors in the surrounding environment.

Furthermore, many existing packages are configured essentially as wrappings. Therefore, they are suitable for packaging solid/rigid food products only and, in any case, due to their inherent and necessary flexibility, they do not facilitate product consumption by the final user, despite being conceived as ready-meal enclosures.

On the other hand, prior art casings made entirely of a fibrous material, in particular paper, that is a breathable material, require sealing of their margins by adhesives, which are of an essentially thermoplastic nature. Generally speaking, during heating of the food product the temperature and pressure conditions that are established in the package bring such adhesives at or near their softening point. Consequently, the casing tends to open in the oven, which is, of course, very much undesired, considering the potential contamination to which the food products contained in the same package may be exposed during the heating/baking process and, as previously mentioned, with the consequent possible dirtying of the appliance. Besides to this, also in this case a failure in the integrity of the seals can cause a dispersion of undesired odors in the surrounding environment and the already mentioned outflow of fat substances.

SUMMARY

The technical problem underlying the present disclosure is therefore to overcome the drawbacks mentioned above with reference to the state of the art. The above problem is solved by a food container, or packaging, according to claim 1.

The present disclosure also relates to a food wrapping.

Preferred features of the invention are object of the following description and/or the dependent claims.

The container, or packaging, of the present disclosure is apt to be placed in an appliance, in particular an oven, for heating or baking a food product contained inside the packaging. Preferably, the container is apt to resist to a temperature up to 280° C., advantageously for at least two minutes. Advantageously, the container is capable to obtain a temperature distribution along the vertical section of the contained product having a variance comprised between 0 and 4° C. for each centimeter of vertical section of the container.

The container, or packaging, has a glass-, cup-, bowl- or plate-shaped main portion, preferably rigid. Such main portion can be made predominantly of a fibrous cellulosic material, in particular consisting of fibers coming from fast growing annual plant, such as for example: straw, bagasse, bamboo, cane, linen, hemp, ramie or others. As an alternative, the main portion can be made entirely or as a mixture between the previous essences and those coming from slowly growing timber trees, such as for example conifers, broad-leaved trees or the like. In general terms, such fibrous cellulosic material can be obtained from a substance that permits to have the availability of a fibrous structure adapted to obtain a paper pulp.

Along with the fibrous cellulosic pulp, the material of which the main portion is made can advantageously include mineral fillers and/or chemical additives. Such further components are of the type apt to permit a suitable shaping, resistance and/or stiffness of the container as required by the product to be packaged.

Furthermore, when necessitated by the packaging requirements of products capable to release undesired odor-generating substances, such further components are suitable for providing the container with odorous-substance control properties.

In particular, the packaging here described is capable to control the emission—evaluated according to the method UNI EN 13725-2003—of odor-generating substances released during heating or baking, and this by making use of substances or materials that act as a barrier or perform the function of molecular sieves. In particular, cellulosic fibers, coatings or mixtures containing chitosan, graphene, zeolites, activated carbon, or others.

Said substances, when necessary, can be added to the fibrous mixture that forms the container or a part of it, or be applied in the form of an outer layer, an intermediate layer or a coating.

The main portion of the container is sealed at a substantially flat rim thereof, in particular an upper rim, by a cover, or closure, portion, in particular in form of a layer or foil, the latter being advantageously of a flexible type.

The closure portion can have the same shape of the main portion section that it closes, or a different shape. For example, in case of a main portion having a circular geometry, the cover portion can be circular or have a polygonal shape that circumscribes and/or surrounds the basic circular shape. Also the cover portion can be made of fibrous cellulosic material, e.g. cellulosic fiber, and in particular one of the materials or combinations of materials mentioned above in connection with the main portion. The cover portion may have a weight less than or equal to ($\leq$) about 150 g/m$^2$, preferably comprised in a range of about 60 g/m$^2$ and 125 g/m$^2$.

The main portion of the container can be possibly subdivided into, or comprise, a plurality of compartments, both for housing different types of food, and to permit to heat or bake individually different components of a food product before assembling it. For example, if a sandwich is packaged, the top bread portion can be placed in a compartment of the container, arranged upside-down to heat the inner side, and the filling—e.g. a burger, eggs, or other ingredients—can be placed in another compartment.

In preferred embodiment, the main portion of the container provides a plurality of compartments and is configured so as to be reclosable on itself, in particular refoldable, once the heating or baking function has been carried out, and the upper closure layer has been removed. In other words, the main portion of the container is configured so as to make for a close and reclosable container.

Preferably, the main portion of the container has a Taber stiffness (15° ISO 2493) measured in a homogeneous section region, comprised between about 20 and 1000 mN.

Besides, said main portion has preferably a permeability to water vapor, measured in standard conditions of 38° C. and 90% R.H., comprised between about 30 and 1500 g/m$^2$/24 h.

According to a preferred embodiment, the main portion of the container has a multi-layer construction, with a thickness comprised between about 100 and 3000 μm for each layer. At least one layer is made, at least predominantly, of a fibrous cellulosic material.

According to a further preferred embodiment, the main portion of the container has a bottom developing at differentiated planes that create a discontinuous surface for contact with the contact flat surface of the heating or baking appliance. In particular, one or more feet, ridges or protrusions may project from the container wall facing the baking or heating surface, and thus typically from the bottom of the container, to space the same wall from the baking surface and promote an air circulation between the appliance contact surface and said container wall.

Advantageously, the main portion of the container is thermoresistant.

Besides, if necessary depending on the specific use, it can be, also or alternatively, thermal insulating.

This thermoresistant and/or thermal insulating property can be obtained by making use of a multi-layer structure, in particular a sandwich structure, with an intermediate layer made of a thermoresistant and/or thermal insulating material, and outer layers made of cellulosic fiber. The intermediate layer may consist of, or comprise, for example, an aerogel obtained starting from an alkali metal silicate, possibly even mixed with cellulosic fibers, that is heated at a temperature comprised between 100° C. and 300° C. and/or exposed to microwaves.

Advantageously, one or both the portions that form the container or packaging are made of a breathable and/or permeable to water vapor material, such as in particular the above mentioned fibrous cellulosic material.

Therefore, advantageously, the container of the present invention permits gas transpiration/breathability, in particular as far as water vapor is concerned, during the heating or baking process, without being it necessary to open the package or to provide apertures therein.

Preferably, such transpiration/breathability affects the whole surface of the packaging or at least of its main portion.

Moreover, the shape of the food receiving main portion allows for the user to consume the product, easily and in a clean manner, directly from its container, once the cover upper portion has been peeled off after the baking/heating.

Preferably, the cover upper portion is thermally sealed to the lower main portion. In particular, a perimeter rim of the main portion, corresponding to its upper edge, is bonded to a corresponding perimeter surface of the cover portion. Preferably, the contact linear extension between the main portion, typically rigid, and the cover, generally flexible, involves the whole perimeter of the contact region between the rigid and the flexible portion, and transversally it is advantageously comprised between 2 mm and 40 mm.

This arrangement ensures an ideal connection and tightness, and prevents the whole container from opening during the baking or heating process.

The container described above can be used also for packaging liquid food products. In that case, the surfaces contacting the food product can be treated so as to be resistant to the penetration of water or other liquid or fats, although maintaining the permeability to water vapor, as necessary to carry out the heating or baking of the product, without resorting to the apertures of the known art. To this purpose, a water-resistant and, if necessary, nonstick layer consisting mainly of silica—e.g. in the form of a orthosilicate—can be used. This layer may be applied only to the contact regions between the container and the food product, in order to prevent the moistening of the main fibrous cellulosic material. The surface treatment, after a process based on heating, is capable to generate an effective barrier against the aggression of free water or fats, though permitting the necessary passage of the water vapor produced during the oven heating or baking.

According to a different aspect of the present disclosure, a packaging is provided in the form of a wrapping, typically made of a flexible material. The packaging can be obtained from a continuous sheet of cellulosic material, in particular paper, preferably thin and substantially in the form of a membrane. For example, it can have a thickness comprised between about 40 μm and 200 μm.

Portions of the continuous sheet can be cut and folded so as to form the wrapping. During or after the folding process, selected margins or lateral edges of each portion can be connected one another, e.g. by thermo-sealing, so as to close the wrapping around a food product to be enveloped.

The flexible wrapping obtained from a continuous sheet of a cellulosic material can have properties thermo-sealing, resistance to heat, water and fats, as the main portion or the closure portion of the container described above in connection with the first aspect of the present disclosure, said properties being obtained through the use of the same technologies.

Likewise, also the cover portion of the aforementioned container according to the first aspect of the present disclosure can be cut from a continuous sheet of cellulosic material, similarly to the second aspect of the present disclosure.

Most preferably, both types of packages mentioned above achieve a sealing of the package—of the cover portion over the food-receiving portion or of edges of the wrapping, respectively—by a special polymeric adhesive composition or substance. The latter may be applied only in the contact regions between the two package portions of the first aspect of the present disclosure, or at the edge portions of the flexible package of the second aspect of the present disclosure. Such polymeric adhesive composition comprises, and preferably consists of:
- a thermally activable liquid (in particular aqueous) adhesive phase, adapted to stick to a cellulosic material, preferably including one or more of the following: sodium silicate, potassium silicate, polyvinyl alcohol, carboxymethylcellulose, acrylic resins, polyurethane resins, vinyl resins;
- a powder, or resin, of thermosetting polyester, preferably including one or more of the following: carboxylate polyester resin, polylactic acid powder, caprolactam epoxy resin powder.

Advantageously, the liquid phase includes a solid content comprised in a range 10%-70% in weight of the total, and the amount or powder, or resin, possibly a thermosetting one, is comprised in a range 1:0.05-1:5 with respect to the dry matter content of the employed carrier liquid. For example, if the carrier liquid has a dry content of 30%, 300 g of dry matter will be present in 1 kg of carrier liquid; in case of a 1:1 ratio, 300 g of powdered polymer will then be present, and so on based on the necessary formulation.

This special composition has two main properties, namely of being thermally (re)activable to provide its adhesive function and of being thermoresistant with a temperature resistance range comprised between about 100° C. and 280° C. such thermoresistant property can be obtained by using particular types of materials, comprising resins, in particular acrylic and vinyl resins, modified polyvinyl acetate and thermosetting ones such as polyester or others.

The polymeric composition is previously applied onto the surfaces to be connected and then dried causing the above mentioned liquid phase to evaporate. The polymeric composition may be pre-applied and pre-dried at contact regions of outer edges of the upper peripheral rim of the rigid lower portion, with a dried weight comprised in a range of about 2-50 g/m$^2$.

When the packaging has to be closed/sealed, heat can be supplied so as to determine activation of the adhesive properties of the composition, and thus to join/connect the relevant surfaces. At the same time, still due to heat supply, a polymerization of the powder is activated so as to make the composition thermoresistant. This hardening of the composition contributes to seal the packaging.

Furthermore, the seals of the packaging can face temperatures from 100° C. to 280° C. without opening or deteriorating.

In use, the packaging can be included in an external wrap or envelope, eventually bearing printed information concerning the food product. This outer wrap or envelope can contribute to reduce the loss of water vapor or to preserve a modified atmosphere inside, during shelf life or storage. Once such external wrap or envelope has been removed, the packaging can be put into an appliance for baking or heating purposes, without being it necessary to open the inner, product receiving package.

In combination with the outer wrap or as an alternative to it, again to reduce the loss of water vapor during the product storage/shelf lifetime, coatings of various nature may be applied on the outside of the portions of the container or wrapping (therefore not in contact with the food product). These coatings may e.g. comprise shellac, acrylic resin, talc-type filler, chitosan graphene, or else, possibly mixed with the same carrier liquid used for the above cited adhesive polymeric composition. These coatings may form a water-impermeable layer having a thickness comprised between about 0.1-40 μm.

During heating or baking, permeability to water vapor of the cellulosic material of the packaging in direct contact with the food product can be exploited, without the sealing properties of the composition being impaired.

The present disclosure, based on preferred embodiments thereof, provides therefore a packaging adapted to elevate the temperature of the food product inside the same packaging and capable of eliminating overpressure generated by water vapor inside the packaging due to rising temperature, without any aperture communicating the inside of the packaging itself with the outside environment. The packaging is also capable of restraining/reducing the emission of odor-producing substances generated during the heating or baking of the packaged food product, with respect to what occurs in the absence of a packaging, or with a packaging provided with apertures.

Other advantages, features and use modes of the present disclosure will become apparent from the following detailed description of embodiments thereof, provided by way of example and not with limiting purpose.

BRIEF DESCRIPTION OF THE DRAWINGS

Reference will be made to the figures of the annexed drawings, wherein.

DETAILED DESCRIPTION OF PREFERRED EMBODIMENTS

With reference to the above figures, some preferred embodiments will now be described, which mainly concern the conformation of the aforementioned main portion and closure portion.

The materials of which the packages are made, and the modes of joining the cover element onto the main portion have already been illustrated above.

Figure 1:
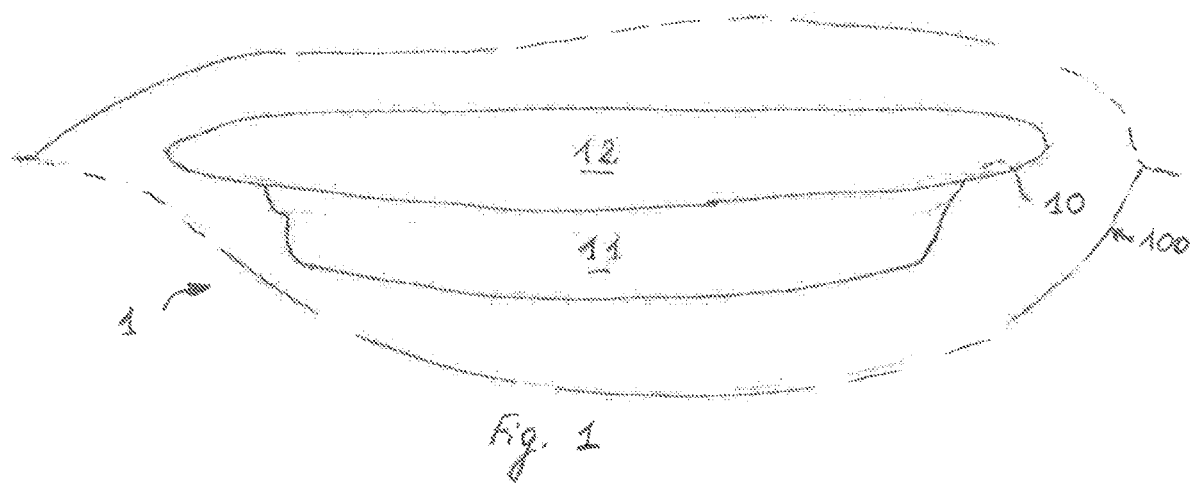
FIG. 1 shows a side view of a food container in the form of a dish or tray according to a first preferred embodiment.

Referring initially to FIG. 1, a package, or container, made according to a first preferred embodiment is denoted globally by 1. It comprises a rigid main portion 11 intended to receive a food and shaped like a pan or plate, in particular having a circular profile in plan view, and a cover portion 12 applied at a perimetral rim 10 of the pan or plate.

FIG. 1 also shows an outer casing 100 of packaging 1 which is removed before introduction into the oven.

Figure 2A:
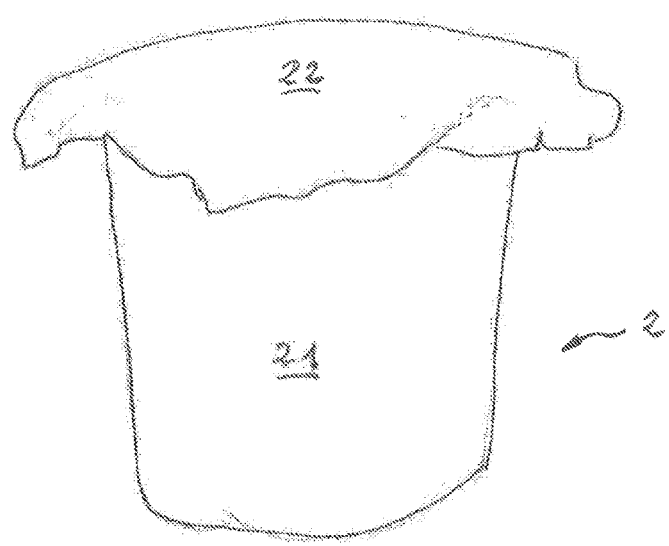
FIG. 2A is a side view of a food container in the form of glass or cup of a second preferred embodiment.
Figure 2B:
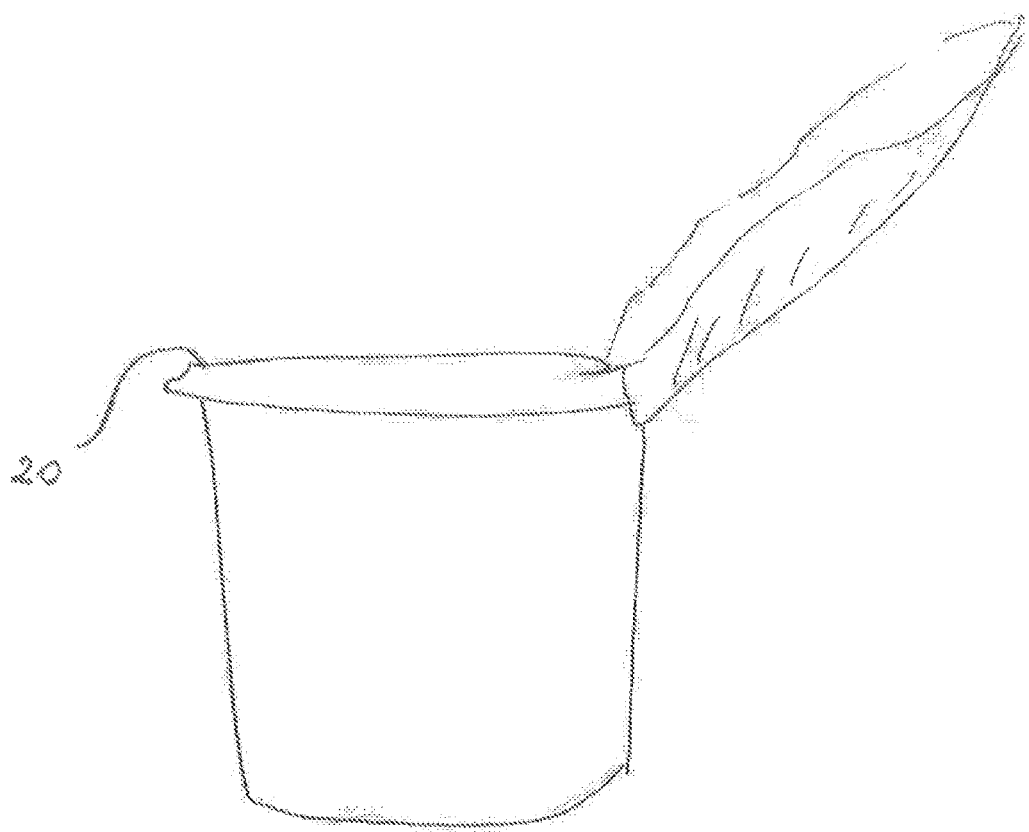
FIG. 2B shows a side view of the container of FIG. 2A in an open configuration.

With reference to FIGS. 2A and 2B, a packaging or container made according to another preferred embodiment is denoted globally by 2. It comprises a rigid main portion 21 for receiving a food and shaped as a cup or cup, in particular having a circular profile in plan view, and a covering portion 22 applied at a peripheral rim 20 of the glass or cup.

Figure 3A:
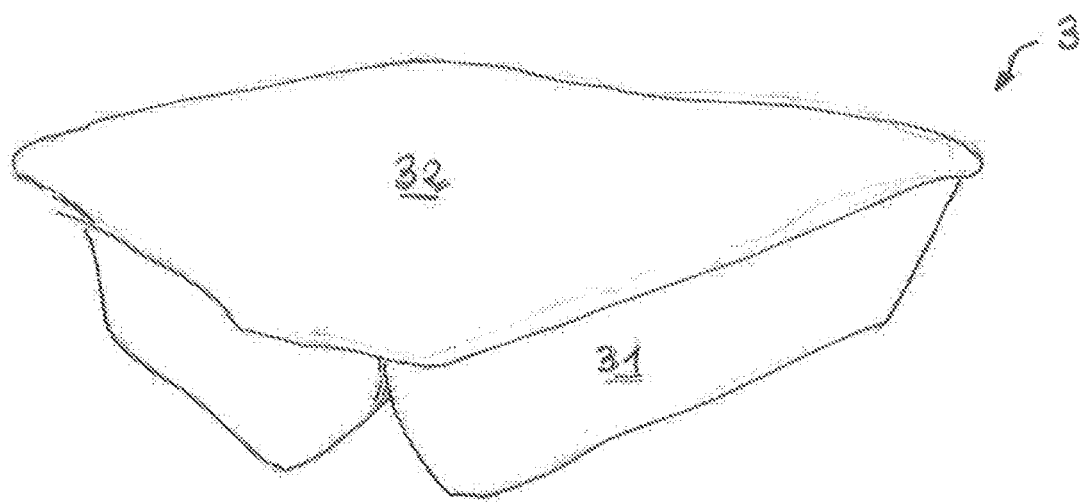
FIG. 3A shows a side view of a food container in the form of a multi-compartment pan according to a third preferred embodiment.
Figure 3B:
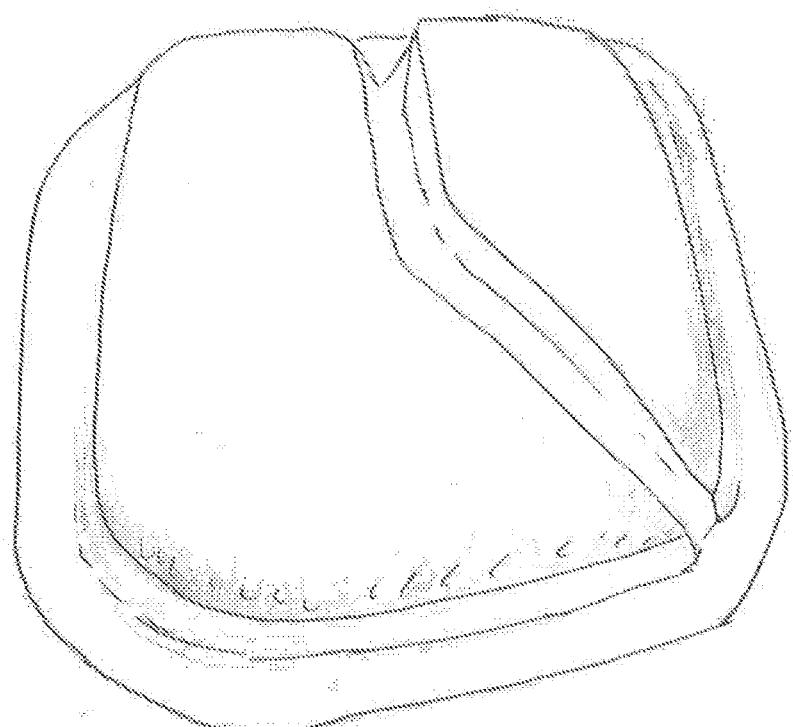
FIGS. 3B and 3C refer to the container of FIG. 3A, showing respectively a plan view from below and a plan view from above, the latter in an open configuration.
Figure 3C:
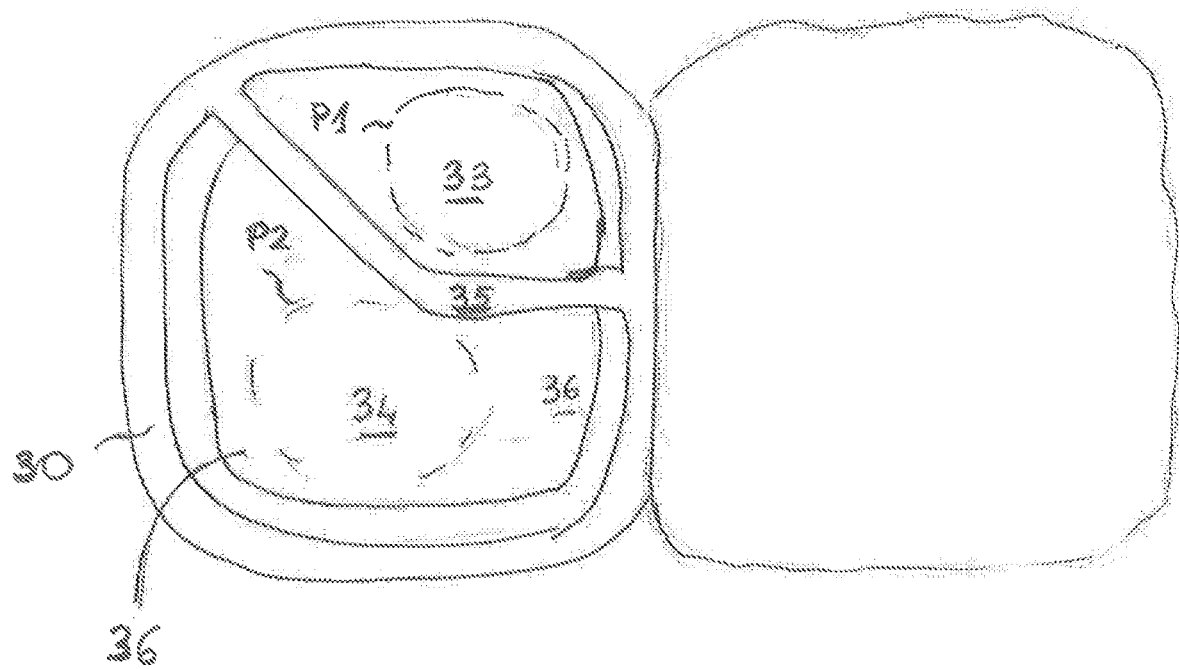
Figure 3D:
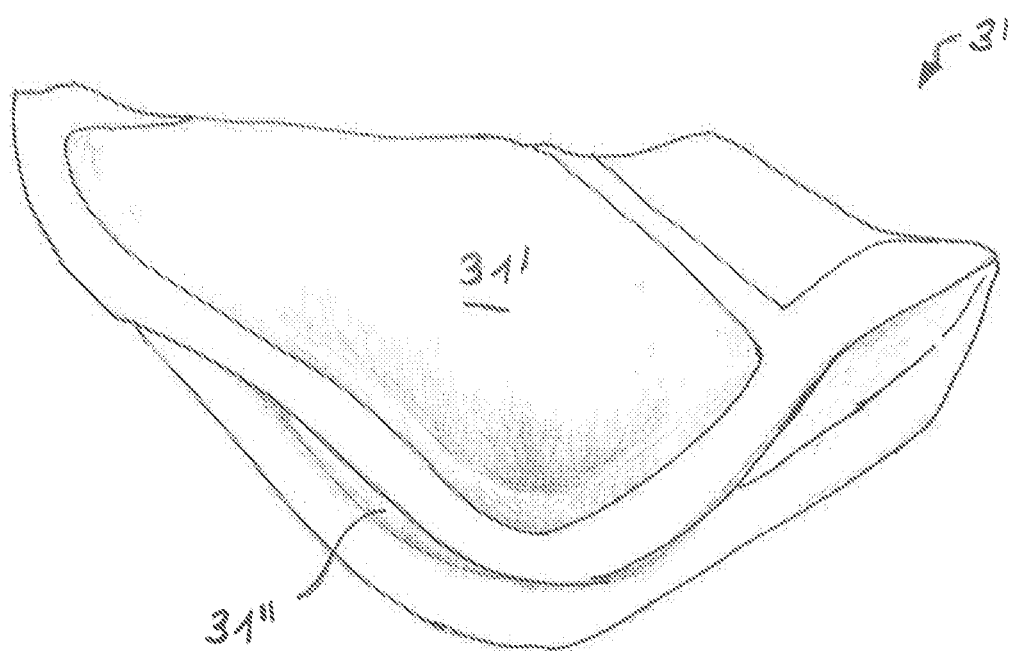
FIG. 3D shows the container of FIG. 3A in a different, reclosed configuration downstream of the heating or baking of a food received therein.

With reference to FIGS. 3A to 3C, a packaging, or container, made according to a further preferred embodiment is globally denoted by 3. It comprises a rigid main portion 31 for receiving a food and shaped as a multi-compartment pan, in particular having a polygonal shape, e.g. a squared shape, in plan view. The main portion 31 defines an inner space subdivided into a first compartment 33 and a second compartment 34 separated by an intermediate septum 35. In the present example, the first compartment 33 has a capacity lower than that of the second compartment 34.

Packaging 3 also comprises a cover portion 32 applied at, and adhered to, a peripheral rim 30 of main portion 31 and preferably also at the upper edge of septum 35.

As shown in FIG. 3, after the packaging 3 has been placed in the oven and the baking of the product received therein has been carried out, the lid portion or cover 32 is peeled and the main portion 31 is folded, at an angular margin of the first compartment 33, onto the opposite portion, so as to form a clamshell constituted by two half-shells 31' and 31" arranged one above the other. Packaging 3 may have locking elements, for example in the form of protrusions/projections, and corresponding seats, to lock the two half-shells 31' and 31" one onto the other.

This embodiment is particularly advantageous for optimally heating sandwiches with burgers or with a different hot stuffing.

In fact, if the heating took place with the two sandwich portions overlapped and the burger at the center, it would not be possible to get the effect of crunchy bread also at the center, because the water vapor released by the meat would not allow it to dry. On the contrary, by placing on one side, in particular in the first compartment 33, the slice of bread with the inside upward and on the other part, particularly in the second compartment 34, the meat not in contact with the upper sandwich portion, a perfect browning of the product is obtained. After baking, by folding the tray portion 31 onto itself, the sandwich is composed in its standard shape. This situation is exemplified in FIG. 3, wherein the two parts of the sandwich are denoted by P1 and P2.

The main portion 31 has an inner surface 36 in contact with the food product which can be treated or coated so as to be impermeable to liquid and grease.

The main portion 31 has a surface 36 in contact with the food product which may extend according to discontinuous planes at the part facing the oven baking or heating plane.

The present disclosure has been presented so far with reference to preferred embodiments. It is intended that there may be other embodiments which refer to the same inventive concept as defined by the scope of the following claims.

The invention claimed is:

1. A polymeric adhesive composition comprising:
   a thermally activatable adhesive carrier having a liquid phase, the adhesive carrier configured to adhere to a cellulosic material, the adhesive carrier including one or more components selected from the group consisting of: sodium silicate, carboxymethylcellulose, and polyurethane resins; and
   a thermosetting polymeric powder, including one or more components selected from the group consisting of: polylactic acid powder and caprolactam epoxy resin powder.

2. The polymeric adhesive composition according to claim 1, wherein
   said liquid phase has a solid content comprised in a range of 10%-70% of total weight of said liquid phase, and
   a ratio between the powder and the solid content ranges between 1:0.05 and 1:5.

3. The polymeric adhesive composition according to claim 1, wherein the liquid phase is an aqueous phase.

4. A continuous sheet of cellulosic material having a weight ≤150 g/m² and a coating, the coating being made of the polymeric adhesive composition according to claim 1.

5. A wrapping for a food product, the wrapping consisting of the continuous sheet of claim 4 in a wrapped configuration.

6. A method of making a wrapping or a packaging for a food product by sealingly connecting a first surface and a second surface of the wrapping or packaging, the method comprising the steps of:
   applying the polymeric adhesive composition according to claim 1 upon at least one of the first surface and the second surface;
   placing the first surface and the second surface in mutual contact; and
   supplying heat to activate
      an adhesive property of the thermally activatable adhesive carrier of the polymeric adhesive composition, and
      a thermoresistant property of the thermosetting powder of the polymeric adhesive composition,
   thereby sealingly connecting the first surface with the second surface.

7. A packaging comprising the polymeric adhesive composition according to claim 1.

8. The packaging according to claim 7, wherein the polymeric adhesive composition is at outer edges of the packaging.

9. The packaging according to claim 8, wherein the packaging has a rigid lower portion, the polymeric adhesive composition being at an upper peripheral rim of the rigid lower portion.

10. The packaging according to claim 9, wherein the polymeric adhesive composition has a dried weight ranging between 2 and 50 g/m².

11. The packaging according to claim 7, the packaging containing a food product.

* * * * *